US009992452B2

(12) United States Patent
Robinson et al.

(10) Patent No.: US 9,992,452 B2
(45) Date of Patent: Jun. 5, 2018

(54) IPTV SYSTEM, AN APPLICATION SERVER AND A RELATED LOCATION AGENT

(75) Inventors: David Robinson, Wiltshire (GB); Andrey Kisel, Berkshire (GB); Christiaan Schutte, Voorschoten (NL)

(73) Assignee: Provenance Asset Group LLC, Essex, CT (US)

( * ) Notice: Subject to any disclaimer, the term of this patent is extended or adjusted under 35 U.S.C. 154(b) by 1167 days.

(21) Appl. No.: 11/958,366

(22) Filed: Dec. 17, 2007

(65) Prior Publication Data

US 2008/0172706 A1 Jul. 17, 2008

(30) Foreign Application Priority Data

Dec. 19, 2006 (EP) ..................................... 06291988

(51) Int. Cl.
| | |
|---|---|
| *H04N 7/173* | (2011.01) |
| *H04N 21/258* | (2011.01) |
| *H04N 21/414* | (2011.01) |
| *H04N 21/422* | (2011.01) |
| *H04N 21/442* | (2011.01) |
| *H04N 21/61* | (2011.01) |

(52) U.S. Cl.
CPC ... *H04N 7/17318* (2013.01); *H04N 21/25841* (2013.01); *H04N 21/25875* (2013.01); *H04N 21/41407* (2013.01); *H04N 21/42201* (2013.01); *H04N 21/44218* (2013.01); *H04N 21/6125* (2013.01); *H04N 21/6131* (2013.01)

(58) Field of Classification Search
USPC ........................................................ 725/109
See application file for complete search history.

(56) References Cited

U.S. PATENT DOCUMENTS

| | | | | |
|---|---|---|---|---|
| 6,553,236 | B1 * | 4/2003 | Dunko et al. ............... | 455/456.1 |
| 7,565,157 | B1 * | 7/2009 | Ortega ..................... | H04W 4/02 |
| | | | | 455/414.3 |
| 7,761,900 | B2 * | 7/2010 | Crayford ......................... | 725/87 |
| 7,908,379 | B2 * | 3/2011 | Droz ................... | H04L 29/1216 |
| | | | | 455/435.1 |
| 8,068,847 | B1 * | 11/2011 | Fegan .................... | G06Q 50/00 |
| | | | | 340/568.1 |
| 8,117,246 | B2 * | 2/2012 | Sadovsky ......... | G06F 17/30035 |
| | | | | 707/899 |

(Continued)

FOREIGN PATENT DOCUMENTS

| | | |
|---|---|---|
| WO | WO 03/056830 A1 | 7/2003 |
| WO | WO 2006/069603 A1 | 7/2006 |
| WO | WO 2006/133032 A1 | 12/2006 |

*Primary Examiner* — Mushfikh Alam
(74) *Attorney, Agent, or Firm* — Dinsmore & Shohl LLP

(57) ABSTRACT

The present invention relates to an IPTV System for provisioning IPTV services to a subscriber of said IPTV system. The IPTV-system comprises an application server for provisioning IPTV services to the subscriber via a first client device that is associated to the subscriber and the first client device. The application Server is coupled to the first client device over a communications network.

The IPTV system further comprises a location determination part that is adapted to determine an actual location of the subscriber and a service provisioning determination part that is adapted to determine alternative means for provisioning the IPTV services to the subscriber based on the location of the subscriber.

9 Claims, 1 Drawing Sheet

(56) References Cited

U.S. PATENT DOCUMENTS

| | | | |
|---|---|---|---|
| 8,559,968 B2* | 10/2013 | Frank | G06Q 30/02 |
| | | | 455/404.2 |
| 8,700,050 B1* | 4/2014 | Thomas | H04W 4/02 |
| | | | 455/404.2 |
| 2003/0037331 A1* | 2/2003 | Lee | 725/32 |
| 2004/0031058 A1 | 2/2004 | Reisman | |
| 2005/0034158 A1* | 2/2005 | DeLaVega | H04N 7/17318 |
| | | | 725/75 |
| 2005/0125819 A1* | 6/2005 | Ono et al. | 725/14 |
| 2006/0225108 A1* | 10/2006 | Tabassi et al. | 725/100 |
| 2006/0259927 A1* | 11/2006 | Acharya et al. | 725/61 |
| 2007/0044119 A1* | 2/2007 | Sullivan et al. | 725/9 |
| 2007/0067808 A1* | 3/2007 | DaCosta | 725/62 |
| 2007/0214484 A1* | 9/2007 | Taylor | H04H 60/80 |
| | | | 725/100 |
| 2008/0077964 A1* | 3/2008 | Hamilton | 725/87 |
| 2011/0099587 A1* | 4/2011 | O'Neil | 725/62 |
| 2011/0244887 A1* | 10/2011 | Dupray et al. | 455/456.2 |

\* cited by examiner

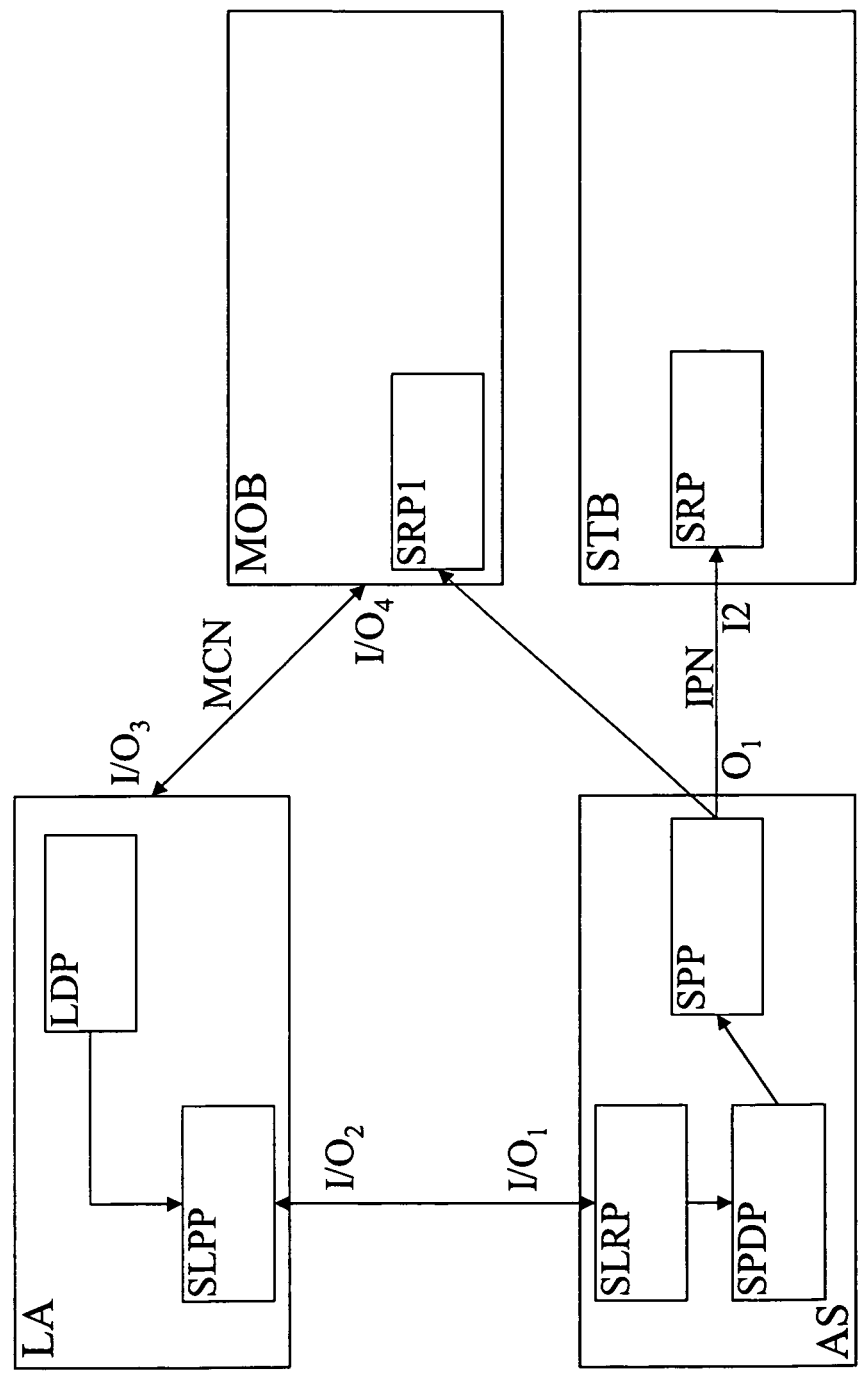

IPTV SYSTEM, AN APPLICATION SERVER AND A RELATED LOCATION AGENT

The present invention relates to an IPTV System for provisioning IPTV services to a subscriber of said IPTV system as described in claim 1, a related Application Server as described in claim 4.

A typical IPTV network, consists of Application server, a set of Media Servers, other optional servers (e.g. game servers, omitted for simplicity) and IPTV client devices, also referred to as 'client device' or 'Set-topBox'.

In such an IPTV system the IPTV client device typically receives a number of service offers from the IPTV head-end, e.g. video on demand, broadcast TV, subscription TV, e-mail, Internet, games. These offers are presented to the user when it accesses the client.

The main problem of the existing IPTV system is that the head-end, called the application server, provisions IPTV service offers and services while being agnostic to user presence, meaning that the IPTV service offers are made independent of subscriber's presence resulting in an amount of IPTV service offers not accessed due to subscribers absence.

It is an object of the present invention to provide with an IPTV system and a related application server of the above known type but wherein the IPTV service provisioning to a subscriber is provided in way that the IPTV service has a higher availability and that subscriber targeting is more efficient.

According to the invention, this object is achieved by the system described in claim 1, the application server as described in claim 4 and the related location agent as described in claim 5.

Indeed, this object is achieved due to the fact that the IPTV system comprises a location determination part that is adapted to determine an actual location of the subscriber; and a service provisioning determination part that is able to determine the alternative means for provisioning said IPTV services to the subscriber based on the location of the subscriber. In this way by determining the location of the subscriber it is possible to determine whether or not the IPTV services presently available for the subscriber immediately can be delivered to the client device. If the presently available IPTV services are not to be delivered at the client device due to the fact that the subscriber is not present at the subscriber device the IPTV service can be delivered via alternative means, e.g. at a mobile device of the subscriber or even another subscriber device in order to reach the subscriber at the moment of availability of the service. The IPTV services may include billing, offers such as movies or games or offer-packages for e.g. subscription channels.

This is further advantageous in that personalized advertising can be improved if it is tailored only to users actually using the service or if it is tailored for user location.

A further characteristic feature is described in claim 2 and claim 5.

The alternative means is a mobile device associated to the subscriber for provisioning the available service, if the subscriber is not present at the first client device. In this way, the application server can provide an available service in case of absence of the subscriber at location of the first client device, to the subscriber via a mobile subscriber terminal of the subscriber.

Another further characteristic feature is described in claim 3 and claim 6.

The alternative means is a delayed provisioning to the first client device, if the subscriber is not currently present at said first client device. In this way, the application server can provide an available service in case of absence of the subscriber at location of the first client device, by delaying the service provisioning till the moment the subscriber is actually present at the first client device. At arrival of the subscriber at the first client device the application server will detect the arrival and subsequently provisions this service to the client device that in turn enables the subscriber to access the service.

A further characteristic feature is described in claim 8.

The location can be determined based on the location of a mobile terminal associated to said subscriber.

Still a further characteristic feature is described in claim 9.

The location of the subscriber can be determined from the IP Multimedia Subsystem IMS by requesting presence information from the Home Subscriber Server HSS.

Still a further characteristic feature is described in claim 10.

The location can be determined based on service profile registration or de-registration (sign-in/sign-off). For instance, an IPTV service at home may have several user profile registrations such as child, adult, family. If child profile registration is used, adult part of service personalization can be omitted. Still a further characteristic feature is described in claim 11. The location can be determined based on user registration or de-registration (sign-in/sign-off). For instance, an IPTV service at home may be associated with several users: father, mother, and child. If father registration is used, mother and child part of service personalization can be omitted.

Still another further characteristic feature is described in claim 12.

The presence or absence of the subscriber can alternatively be determined from not accessing services for some time.

It is to be noticed that the term 'comprising', also used in the claims, should not be interpreted as being restricted to the means listed thereafter. Thus, the scope of the expression 'a device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The above and other objects and features of the invention will become more apparent and the invention itself will be best understood by referring to the following description of an embodiment taken in conjunction with the accompanying drawings wherein:

FIG. 1 represents a functional representation of an IPTV System for provisioning IPTV services to a subscriber of this IPTV system.

In the following paragraphs, referring to the drawing in FIG. 1, an implementation of the IPTV system for provisioning IPTV services to a subscriber of the IPTV system, is described. In the second paragraph, all connections between mentioned elements are defined.

Subsequently all relevant functional means of the mentioned IPTV system as presented in FIG. 1 are described followed by a description of all interconnections. In the succeeding paragraph the actual execution of the IPTV system for provisioning IPTV services to a subscriber of the IPTV system is described.

The IPTV System for provisioning IPTV services to a subscriber of the IPTV system comprises an application-server AS, that is able to provision IPTV services to the subscriber via a first client device STB that is associated to the subscriber. The application server, also called IPTV head-end, is a server that provisions a subscriber with different kind of IPTV services such as Video on demand, broadcast TV, subscription TV, e-mail internet, games etc. This application server obtains these IPTV services from coupled media servers, games servers, and other servers (not shown in FIG. 1 for reasons of simplicity). When we say that application server AS 'provisions' or 'obtains' IPTV or other services, it does not mandates application server AS to physically deliver them. For example, application server AS can provision a list of available media-on-demand assets from the local media server, but redirect the first client device STB to receive physical on demand media delivery from media server after service selection. The same applies for games on demand and other services.

The IPTV system further includes a first client device for receiving the IPTV services provisioned by the application server AS. The first client device STB may be implemented using a set-top-box or a personal computer and is associated with a user account and thus associated with a subscriber. In case of the set-top box a TV or LCD-screen is coupled to the set top box for visualizing the IPTV services, e.g. broadcast TV, Video on demand, Internet etc.

Furthermore, it is to be noticed that although usually there is a plurality of subscribers and corresponding client devices, for reasons of simplicity only one client device and associated subscriber are presented in FIG. 1.

Besides the client device STB there is in the present invention additionally a mobile client device MOB such as a GSM phone or UMTS device associated to the subscriber. This device is able to receive certain kinds of IPTV services. The mobile network connecting the mobile device MOB further is enabled to determine a current location of the mobile device MOB.

Additionally there is a location agent LA present in the IPTV system of our present invention, that is able to determine the location of the mobile device MOB in order to determine whether or not it is possible to provision an IPTV service to the subscriber via the first client device of said subscriber and if not possible, which alternative means are available for provisioning the IPTV service.

The application Server AS is coupled to the first client device STB over a communications network IPN, such as the Internet. The application server AS and the Location agent LA are coupled over a link on a communications network IPN, such as Internet or they coexist locally and communicate via local interfaces, e.g. RMI (Remote Method Invocation), CORBA or other inter-process communication technologies. The location agent LA is coupled to the mobile device over the mobile communication network MCN, which may be a mobile communications network such as a GSM-network or an UMTS-network.

The application server AS first comprises a service provisioning part SPP that is able to provision IPTV services to the first client device STB. The service provisioning part SPP, further is adapted to provision the IPTV services via alternative means for provisioning the IPTV services. The application server AS further includes a subscriber location retrieval part SLRP that is able to retrieve a current location of the subscriber from a location agent LA that in turn is able to determine the location of the subscriber based on the location of the mobile phone owned by the subscriber. The application server AS further comprises a service provisioning determination part SPDP that is adapted to determine alternative means for provisioning the IPTV services to the subscriber based on the location of the subscriber and type of service to be provisioned, e.g. payment overdue reminders. Payment overdue reminders can be send to mobile device if users are on holidays and are detected as not having access to account information via STB.

The service provisioning part SPP is coupled with an output to an output-terminal O1 of the application server AS. The subscriber location retrieval part SLRP has an input/output terminal that is coupled to an input/output terminal I/O1 of the application server AS and is further coupled to the service provisioning determination part SPDP. The service provisioning determination part SPDP additionally is coupled to the service provisioning part SPP.

The first client device STB has a service receiving part SRP that is adapted to receive IPTV services provisioned by the application server AS.

The first client device STB has an input-terminal I1 that is at the same time an input-terminal of the service receiving part SRP.

The Location agent LA comprises a location determination part LDP, adapted to determine an actual location of said subscriber. This location determination part LDP can determine the location of the mobile device MOB based on information as is available in the mobile communications network MCN. In other implementation the location can be determined from IMS subsystem by requesting presence information from Home Subscriber Server. However, the invention does not mandates mobile, IMS or any other external subsystem for determination of user location or presence. For example, the location information can reside inside IPTV subsystem. The Location Determination Part LDP can make a decision about user location upon profile or user registration (sign-on/sigh-off) as discussed above. In other implementation the Location Determination Part can make a decision about user location (user absence) from account usage. In this case, if user has not accessed services from the client device STB for certain period, it can be assumed to be absent (on holidays) and targeted via alternative means.

The Location agent LA further comprises a subscriber location provisioning part SLPP that is able to provide the location of the subscriber as determined by the location determination part LDP to the application server AS.

The mobile device MOB associated with the subscriber comprises a service reception part SRP1 that is adapted to receive an IPTV service from the application server.

In order to explain one particular incarnation and the execution of the present invention it is supposed that a subscriber currently being at home in front of his IPTV system access his subscribed IPTV services such as billings, offers like pay-per-view movies, pay per view sport events, instant messaging (IM) with his buddies, video conferencing, games, others. The IPTV services provided by any of a media server, a game servers are provisioned to the application server at request of the application server AS which is in response to an explicit request or subscription of the subscriber (not shown for reasons of simplicity).

In the context of this document when we say that services are provisioned to the application server, the term 'provisioned' has a non-restrictive generic meaning. It means that AS server is aware about the service availability and can include the service in to the service offer based upon certain conditions. However, it does not mandate application server AS to physically deliver the service should user choose the service from the service offer. The application server AS can redirect user using some mechanism to obtain selected service from actual service provider (e.g. obtain media from media-on-demand server).

The service provisioning part SPP then provisions these subscribed IPTV services to the first client device. The service reception part of the first client device STB then receives these IPTV services. Subsequently, the first client device STB prepares these IPTV services for display at the terminal, e.g. TV screen, computer screen, other. (Not shown).

Now, it is supposed that the subscriber leaves home. All subscribed IPTV services becoming available after the leaving of the subscriber at the application server now are ready for provisioning to the first client device. This is also valid for the movie (video on demand, referred to as VOD) the subscriber has ordered for viewing in the evening when the subscriber is home again. In the prior art situation all IPTV services would be available at the first client device immediately after becoming available. However this situation is not desirable as the subscriber is not at home and hence not able to access these provisioned IPTV services.

In our present invention however, the location agent LA, by means of the Location determination part LDP, keeps track of the location of the subscriber by retrieving location information from the mobile communications network MCN connecting the mobile device MOB of the subscriber. The location information determined by the Location determination part LDP then is presented by means of the subscriber location presenting part SLPP to the application server AS. The application server AS in turn, by means of the subscriber location retrieving part SLRP, retrieves the current location information of the subscriber based on the location of the mobile device MOB. Based on the location information retrieved from the location agent LA, the service provisioning determination part SPDP, determine alternative means for provisioning the IPTV services to the subscriber based on the location of the subscriber. As the subscriber is away from home, the IPTV Video On Demand service provisioning is determined to be delayed till arrival home of the subscriber. Some IPTV service offers are determined to be forwarded to the mobile phone of the subscriber or even to the personal computer the subscriber is currently logged on as the subscriber is at his workplace.

The service retrieving part SRP1 of the mobile device or the service retrieving part of the personal computer the subscriber is logged on to, retrieves the service an present the IPTV service to the subscriber on the screen of the respective mobile device or personal computer.

The ordered video On Demand is determined to be delivered at arrival at home of the subscriber. As soon as the service provisioning determination part SPDP obtains information from the location agent that the subscriber is at home the service provisioning part SPP delivers the ordered Video on Demand item to the service retrieving part SRP of the first client device STB.

The Application server AS, before making an offer or delivering back-office service, requests location information for mobile device(s) associated with the IPTV account.

In an alternative embodiment the location information is instead of being requested directly from the location agent requested from a persistent storage where the location agent LA caches the location information of the mobile device MOB of the subscriber and being associated with the it. This caching is done for enabling aggregated and averaged location decision, location agent caches historic location information for all mobile devices in the persistent storage.

In one embodiment the, IPTV back-office requests instantaneous location of the mobile from the location agent. If the mobile device is not present in the location of the client device, IPTV back-office sends the offer to the mobile device via location agent.

In an alternative embodiment, IPTV back-office requests aggregate location of the mobile from the location agent. If the mobile device on aggregate has not been present in the location of the client device for some time, the IPTV service such as billing information, service offers etc are sent to the mobile device.

User account information and association between user account and 'preferential' media server(s) are stored in the persistent storage. Media server and application server have access to the persistent storage.

An another embodiment for determining the location of the subscriber, is that the location determination part LDP can make a decision about user absence based on account usage. In this case, if user has not accessed services from client device STB for certain period, it can be assumed to be absent (on holidays) and targeted via alternative means such as mobile device for reminder about missing payment to preserve good credit history.

Still in an further alternative embodiment the location of the subscriber can be determined from the IP Multimedia Subsystem IMS by requesting presence information from the Home Subscriber Server HSS.

In a further embodiment, the determining of the location of the subscriber can be determined based on service profile registration or de-registration (sign-in/sign-off). For instance, an IPTV service at home may have several user profile registrations such as child, adult, family. If child profile registration is used, adult part of service personalization can be omitted.

The location can alternatively be determined based on user registration or de-registration (sign-in/sign-off). For instance, an IPTV service at home may be associated with several users: father, mother, and child. If father registration is used, mother and child part of service personalization can be omitted.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. An Internet Protocol Television (IPTV) System for provisioning IPTV services to a subscriber of said IPTV system, said IPTV-system comprising:
   an application server (AS) for provisioning IPTV services to said subscriber via a first client device (STB) associated with said subscriber, said application server (AS) being coupled to said first client device (STB) over a communications network (CN);
   a location determination part (LA) adapted to determine a location of said subscriber, wherein said location is determined based on the current location of a mobile terminal associated to said subscriber, wherein the current location of the mobile terminal is determined by a mobile network connecting the mobile terminal; and a service provisioning determination part (SPDP) adapted to determine alternative means for provisioning of said IPTV services to said subscriber based on said location of said subscriber, wherein said IPTV services are provisioned based on said alternative means, wherein said alternative means is a delayed provisioning to said first client device, subsequent to the location determination part detecting the arrival of said subscriber at said first client device.

2. An IPTV system according to claim 1, wherein said alternative means is a mobile device associated with said subscriber, if said subscriber is not present at said first client device (STB).

3. An application server (AS) for provisioning Internet Protocol Television (IPTV) services to a subscriber of an IPTV system, said IPTV-system comprising an application server (AS) for provisioning IPTV services to said subscriber via a first client device (STB) associated with said subscriber and said first client device (STB), said application Server (AS) being coupled to said first client device (STB) over a communications network (CN), said application server comprising a service provisioning part (SPP), adapted to provision said IPTV services to said first client device, wherein said application server (AS) further comprises:

a subscriber location retrieval part (SLRP), adapted to retrieve a current location of said subscriber from a location agent adapted to determine said location of said subscriber, wherein said location is determined based on the current location of a mobile terminal associated to said subscriber, wherein the current location of the mobile terminal is determined by a mobile network connecting the mobile terminal; and a service provisioning determination part (SPDP), adapted to determine alternative means for provisioning of said IPTV services to said subscriber based on said location of said subscriber; and in that said service provisioning part (SPP), further is adapted to provision said IPTV services based on said alternative means, wherein said alternative means is a delayed provisioning to said first client device, subsequent to the location agent detecting the arrival of said subscriber at said first client device.

4. An application server (AS) according to claim 3, wherein said application server delays provisioning of IPTV services to said subscriber, if said subscriber is not present at said first client device (STB).

5. Location agent (LA) for use in an IPTV system for provisioning IPTV services to a subscriber of said IPTV system, said IPTV-system comprising an application server (AS) for provisioning IPTV services to said subscriber via a first client device (STB) associated to said subscriber, and said first client device (STB), said application Server (AS) being coupled to said first client device (STB) over a communications network (CN), said location agent (LA) comprising a location determination part (LDP), adapted to determine an actual location of said subscriber, wherein said location is determined based on the current location of a mobile terminal associated to said subscriber, wherein the current location of the mobile terminal is determined by a mobile network connecting the mobile terminal, wherein said application server comprises a service provisioning determination part (SPDP) adapted to determine alternative means for provisioning of said IPTV services to said subscriber based on said location of said subscriber, wherein said IPTV services are provisioned based on said alternative means, wherein said alternative means is a delayed provisioning to said first client device, subsequent to the location agent detecting the arrival of said subscriber at said first client device.

6. Location agent (LA) according to claim 5, wherein said location is determined based on the presence information requested from a Home subscriber Server of a IP Multimedia Subsystem.

7. Location agent (LA) according to claim 5, wherein said location is determined based on a profile registration.

8. Location agent (LA) according to claim 5, wherein said location is determined based on a user registration.

9. Location agent (LA) according to claim 5, wherein said location is determined based on usage statistic.

* * * * *